United States Patent [19]
Sakai et al.

[11] Patent Number: 5,990,576
[45] Date of Patent: *Nov. 23, 1999

[54] POWER SUPPLY VOLTAGE SUPPLYING CIRCUIT

[75] Inventors: Masaki Sakai; Hironori Fujii, both of Hino; Takaaki Ishii, Sagamihara, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,384

[22] PCT Filed: Jan. 13, 1995

[86] PCT No.: PCT/JP95/00031

§ 371 Date: Jul. 12, 1996

§ 102(e) Date: Jul. 12, 1996

[87] PCT Pub. No.: WO95/19653

PCT Pub. Date: Jul. 20, 1995

[30] Foreign Application Priority Data

Jan. 14, 1994 [JP] Japan ................................. 6-002719

[51] Int. Cl.⁶ ........................................................ H02J 3/38
[52] U.S. Cl. .............................. 307/25; 307/28; 307/130; 323/229; 327/493
[58] Field of Search .................................. 307/31, 32, 33, 307/41, 52, 60, 125, 126, 130, 131, 139, 140, 18, 25, 26, 53, 82, 11, 12, 30, 42, 146; 323/293, 304, 352, 364, 233, 229; 340/660, 664; 364/492, 493; 327/493, 504

[56] References Cited

U.S. PATENT DOCUMENTS

| Re. 23,531 | 7/1952 | Villebonnet | 323/293 |
|---|---|---|---|
| 1,883,613 | 10/1932 | Devol | 307/15 |
| 2,122,748 | 7/1938 | Mayer | 307/149 |
| 2,586,748 | 2/1952 | Villebonnet | 323/293 |
| 2,747,158 | 5/1956 | Le Bel | 323/230 |
| 2,835,867 | 5/1958 | Golden | 323/230 |
| 3,005,148 | 10/1961 | Salomonsson | 323/364 |
| 3,023,355 | 2/1962 | Thorsen | 323/230 |
| 3,263,092 | 7/1966 | Knauss | 323/304 |
| 3,287,623 | 11/1966 | Valancius | 307/31 |
| 3,325,723 | 6/1967 | Grayson | 323/229 |
| 3,428,884 | 2/1969 | Norkahl | 323/364 |
| 3,430,127 | 2/1969 | Weiss | 323/293 |
| 4,129,788 | 12/1978 | Chavannes | 307/11 |
| 4,673,864 | 6/1987 | Dessens et al. | 323/221 |
| 4,687,947 | 8/1987 | Cobb | 307/17 |
| 5,208,485 | 5/1993 | Krinsky et al. | 307/41 |

FOREIGN PATENT DOCUMENTS

59-172830  9/1984  Japan.

*Primary Examiner*—Albert W. Paladini
*Attorney, Agent, or Firm*—Banner & Witcoff, Ltd.

[57] ABSTRACT

The positive potential side output of a voltage source (1) is connected to the positive potential side of a first circuit (10) through a terminal (6); the ground (negative potential) side output of voltage source (1) is connected through a terminal (8) to the ground (negative potential) side of first circuit (10). Also, the positive potential side output of voltage source (1) is lowered by a prescribed voltage Δ V by a Schottky barrier diode (2) and is connected to the positive potential side of second circuit (11) through a terminal (7); the ground (negative potential) side output of voltage source (1) is raised by a prescribed voltage Δ V by a Schottky barrier diode (4) and is connected to the ground (negative potential) side of second circuit (11) through a terminal (9). A power supply voltage supplying circuit can thereby be provided wherein latch-up is avoided while still keeping current consumption and electromagnetic interference (EMI) low.

15 Claims, 4 Drawing Sheets und 5,990,576

POWER SUPPLY VOLTAGE SUPPLYING CIRCUIT

TECHNICAL FIELD

The present invention relates to a power supply voltage supplying circuit wherein power supply voltage is supplied to at least two circuits of different respective operating voltages, and, in particular, it relates to a power supply voltage supplying circuit wherein latch-up is avoided while yet keeping current consumption and electromagnetic interference (EMI) at a low level.

BACKGROUND ART

Conventionally, as a power supply circuit for supplying power supply voltage to two circuits of respectively different operating voltages, the circuit shown in FIG. 4 is known.

In the power supply supplying circuit shown in FIG. 4, voltage V38 and voltage V39 (V38>V39) are respectively supplied from voltage source 32 to a first circuit 38 of operating voltage V38 and a second circuit 39 of operating voltage V39; in this conventional power supply circuit, the construction is such that the ground potential (negative potential) of voltage source 32 that is supplied to first circuit 38 and second circuit 39 is supplied to first circuit 38 and second circuit 39 in common through terminal 37, and the positive potential of voltage source 32 is supplied to the positive potential side of the first circuit through terminal 35 directly, and is supplied to the positive potential side of the second circuit through terminal 36 with a prescribed voltage drop by a Schottky barrier diode 33.

If the potential of terminal 35 is V35, the potential of terminal 36 is V36 and the potential of terminal 37 is V37, V35=V38, V36=V39 and V37=0.

First circuit 38 and second circuit 39 can be regarded as respectively different LSI chips, the operating voltages of first circuit 38 and second circuit 39 being respectively set for example to 4 V and 3.2 V.

In this case, Schottky barrier diode 33 creates a potential difference of 4−3.2=0.8 (V).

Schottky barrier diode 34 is a protective diode. In the drawings, the protective diode is shown with parentheses.

Line 40 is an interface connecting line that connects the first circuit 38 and second circuit 39.

However, the conventional power supply voltage supplying circuit described above is subject to the inconvenience that, since operating voltage V38 of first circuit 38 and operating voltage V39 of second circuit 39 are different and the operating voltage V38 of the first circuit 38 is higher than the operating voltage V39 of second circuit 39, latch-up of the second circuit 39 occurs due to the high level signal input to second circuit 39 through interface connection line 40 from first circuit 38.

FIG. 5 is a view given in explanation of this latch-up phenomenon; in FIG. 5, circuit 48 corresponds to second circuit 39 shown in FIG. 4.

Circuit 48 is supplied with operating voltage Vcc from terminal 41 and has applied to it input signal IN from terminal 42.

Also, circuit 48 is provided with a protective diode 45 connected between LSI chip 47 and terminals 41 and 42 and a protective diode 46 connected between terminal 42 and ground.

When the difference between voltage VIN of input signal IN and operating voltage Vcc exceeds the threshold value Vs of protective diode 45, i.e. when VIN−Vcc>Vs, the current of the input signal IN flows through protective diode 45 as shown by arrow 43 and latch-up occurs.

The latch-up phenomenon can also occur if the voltage VIN of the input signal IN is less by a certain value than the ground potential, with the result that protective diode 46 is turned on and current flows in the direction of arrow 44.

For the above reasons, in the conventional power supply voltage supplying circuit shown in FIG. 4, latch-up occurs if V38−V39>Vs.

As a means for preventing this latch-up phenomenon, as shown in FIG. 6, consideration has been given to providing a level-converting buffer 50 on the interface connection line 40 that connects first circuit 38 and second circuit 39, the difference in levels between the operating voltage V38 of first circuit 38 and operating voltage V39 of second circuit 39 being absorbed by this level-converting buffer 50; however, with this construction, the need for a level-converting buffer 50 involves increased circuit costs.

In the construction of FIG. 4, consideration has also been given to a method whereby the voltage V36 of terminal 36 is set rather higher than the operating voltage V39 of second circuit 39; however, in this method, other problems are created in that the current consumption and electromagnetic interference (EMI) of second circuit 39 become larger.

FIG. 7 shows the output waveform 53 of a first circuit 38 of higher operating voltage shown in FIG. 4 and the output waveform 54 of a second circuit 39 of lower operating voltage. Amplitude 51 indicates the peak value V51 of waveform 53 and amplitude 52 indicates the peak value V52 of waveform 54.

FIG. 8 shows the frequency spectrum of emission energy corresponding to the output wave forms 53 and 54 shown in FIG. 7. Spectrum 55 here corresponds to output waveform 53, while spectrum 56 corresponds to output waveform 54.

Specifically, the circuit current consumption is determined by the product f.C.V. of the frequency f of operation of the circuit, the stray capacitance C, and operating voltage V, so, as the operating voltage becomes higher, the current consumption becomes higher in proportion thereto.

Also, the level of the electromagnetic interference (EMI) is related to the operating voltage of the circuit; however, as is clear from FIG. 8, whether the operating voltage is high or low is greatly influenced by electromagnetic interference (EMI) in the high frequency band in particular.

DISCLOSURE OF THE INVENTION

Latch-up could not be avoided while still keeping current consumption and electromagnetic interference (EMI) low.

Accordingly, an object of the present invention is to provide a power supply voltage supplying circuit wherein latch-up can be prevented while still keeping current consumption and electromagnetic interference (EMI) low.

In order to achieve this object, according to the present invention, a power supply voltage supplying circuit that supplies respectively a first operating voltage and second operating voltage to a first circuit operating with a first operating voltage and a second circuit operating with a second operating voltage lower than the first operating voltage and connected through an interface connection line with the first circuit comprises: a power supply circuit that generates voltage corresponding to the first operating voltage; a first power supply voltage supplying circuit that supplies to the first circuit voltage generated from the power supply circuit; and a second power supply voltage supplying circuit that supplies the second operating voltage to the second circuit, the second operating voltage being formed by lowering the positive potential of the voltage generated from the power supply circuit by a prescribed voltage through a voltage lowering element and raising the negative potential of the voltage generated from the power supply circuit by a prescribed voltage through a voltage raising element.

Also, according to the present invention, a power supply voltage supplying circuit that supplies operating voltages to a plurality of circuits operated by respective different operating voltages and mutually connected through an interface connecting line sequentially comprises: an n-th power supply voltage supplying circuit that supplies n-th operating voltage to an n-th circuit operated by n-th operating voltage of number n counting from the highest operating voltage of the plurality of circuits; and a (n+1)-th power supply voltage supplying circuit that supplies (n+1)-th operating voltage to the (n+1)-th circuit operated with the operating voltage number (n+1), starting from the highest of the operating voltages, the (n+1)-th operating voltage being formed by lowering by a prescribed voltage through a voltage lowering element the positive potential of the voltage of the n-th power supply voltage supplying circuit and by raising by a prescribed voltage through a voltage raising element the negative potential of the voltage of the n-th power supply voltage supplying circuit.

The voltage lowering element and voltage raising element can be respectively constituted of a first diode and a second diode; this first diode and second diode may be constituted of Schottky barrier diodes or silicon diodes; the forward direction voltage drop of the diodes is used for lowering and raising voltages that are 0.35 V for the Schottky barrier diodes and 0.6 V for the silicon diodes.

Also, the first circuit, second circuit, n-th circuit and (n+1)-th circuit may be constituted of CMOS circuits.

BEST MODE FOR CARRYING OUT THE INVENTION

An embodiment of a power supply voltage supplying circuit according to the present invention will now be described in detail with reference to the drawings.

Figure 1:
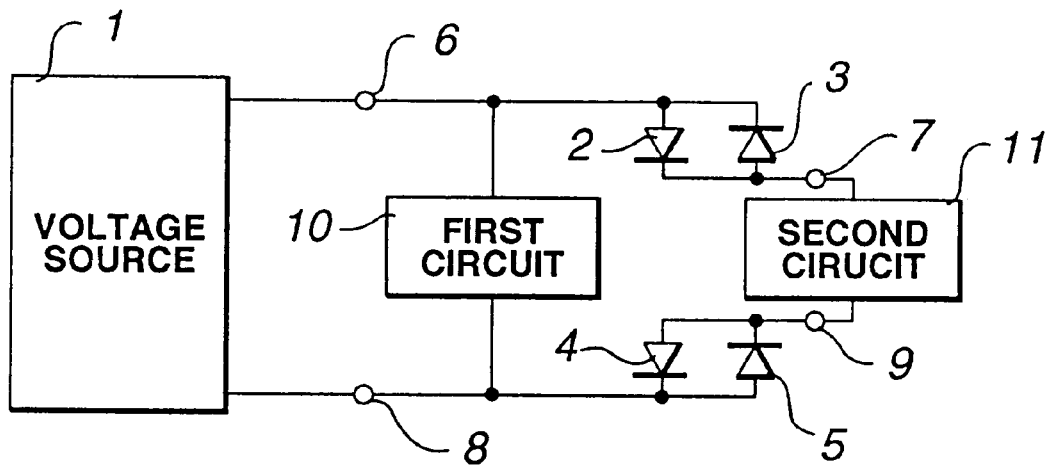
FIG. 1 is a circuit diagram showing a first embodiment of a power supply voltage supplying circuit according to the present invention.

FIG. 1 is a circuit diagram showing an embodiment of a power supply voltage supplying circuit according to the present invention. In the power supply voltage supplying circuit of this embodiment, respective voltages V10 and V11 are supplied from voltage source 1 to first circuit 10, whose operating voltage is V10, and to second circuit 11, whose operating voltage is V11.

The operating voltage V10 of first circuit 10 is larger than the operating voltage V11 of second circuit 11 i.e. V10 is set to be >V11.

Also, first circuit 10 and second circuit 11 are connected by interface connecting line 12.

Also, the positive potential-side output of voltage source 1 is connected to the positive potential side of first circuit 10 through terminal 6, while the ground (negative potential)-side output of voltage source 1 is connected through terminal 8 to the ground (negative potential)-side of first circuit 10.

Further, the positive potential-side output of voltage source 1, after being lowered by a prescribed voltage $\Delta V$ by Schottky barrier diode 2, is connected to the positive potential side of second circuit 11 through terminal 7, while the ground (negative potential)-side output of voltage source 1, after being raised by a prescribed voltage $\Delta V$ by Schottky barrier diode 4, is connected to the ground (negative potential)-side of second circuit 11 through terminal 9.

If the potential of terminal 6 is V6, the potential of terminal 7 is V7, the potential of terminal 8 is V8, and the potential of terminal 9 is V9, V6=V10, V8=0, V7=V10−$\Delta V$, V9=$\Delta V$, and V7−V9=V11.

First circuit 10 and second circuit 11 may be constructed of respective different CMOS LSI chips; the operating voltage of first circuit 10 and second circuit 11 may be set to 4 V and 3.2 V respectively, for example.

Schottky barrier diode 2 creates a potential difference of (4−3.3)/2=0.35 (V) and Schottky barrier diode 4 creates a potential difference of (4−3.3)/2=0.35 (V).

Schottky barrier diodes 3 and 5 are protective diodes.

If the threshold value of the protective diode, not shown, of second circuit 11 is Vs11, V6−V7<Vs11 holds between the potential V6 of terminal 6 and the potential V7 of terminal 7; also, as described above, V7−V9=V11 holds.

With such a construction, second circuit 11 is operated with voltage V11, so current consumption and electromagnetic interference (EMI) can be kept low.

Also, since V6−V7<Vs11 is established, latch-up cannot occur in second circuit 11.

Although the explanation has been made as to the case where Schottky barrier diodes arm used as the voltage lowering element and the voltage raising element, silicon diodes may be used as the voltage lowering element and the voltage raising element. In this case, however, the lowered voltage and raised voltage will be 0.6 V.

Figure 2:
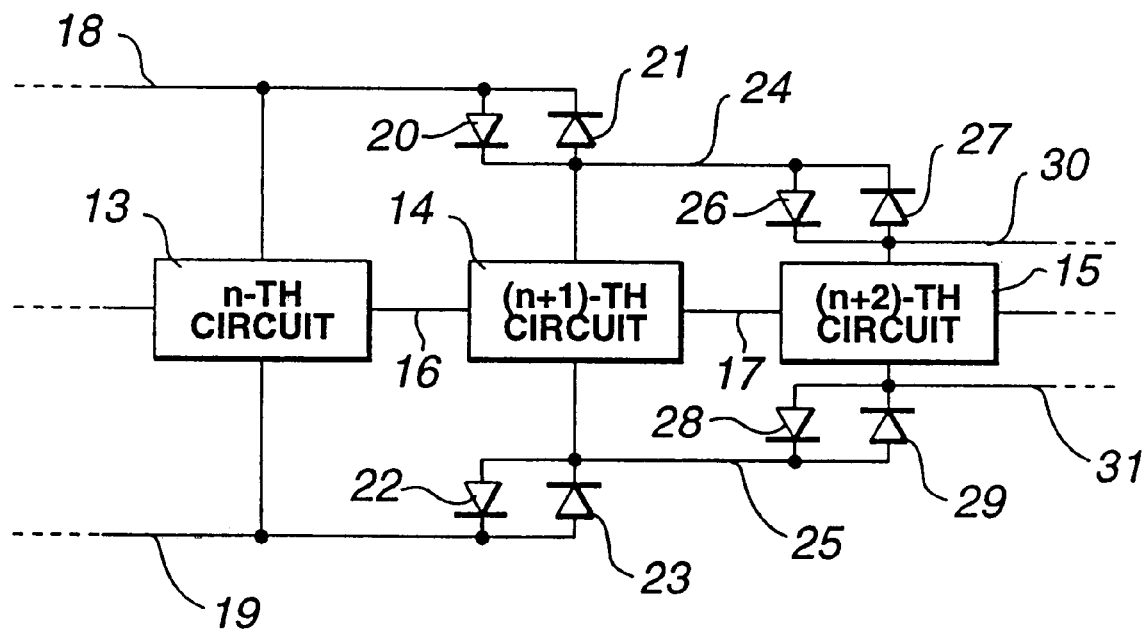
FIG. 2 is a circuit diagram showing another embodiment of a power supply voltage supplying circuit according to the present invention.

FIG. 2 is a circuit diagram showing another embodiment of a power supply voltage supplying circuit according to the present invention; in the power supply voltage supplying circuit of this embodiment, power supply voltage Vn is supplied to n-th circuit 13 of operating voltage Vn by means of line 18 on the positive potential side of the power supply voltage supplying circuit and line 19 on the negative potential side thereof.

Specifically, if the potential of line 18 is V18 and the potential of line 19 is V19, V18−V19=Vn.

Next, the potential of line 18 on the positive side is lowered by a prescribed voltage $\Delta Vn$ by Schottky barrier diode 20 and is connected to line 24 on the positive potential side of (n+1)-th circuit 14, which has an operating voltage of V(n+1), while the potential of line 19 on the negative side is raised by a prescribed voltage Δ Vn by Schottky barrier diode 22 and is connected to line 25 on the negative potential side of (n+1)-th circuit 14.

If the potential of line 24 is V24 and the potential of line 25 is V25, V24−V25=V(n+1), V24=V18−Δ Vn, V25= V19+Δ Vn, and Vn−V(n+1)=2Δ Vn.

Thus, if the threshold value of the protective diode, not shown, of (n+1)-th circuit 14 is made Vs(n+1), it is possible to make Vn−V(n+1)<Vs (n+1), and latch-up of the (n+1)-th circuit 14 can be prevented, while current consumption and electromagnetic interference (EMI) can be kept low.

The same of course holds for (n+1)-th circuit 14 and (n+2)-th circuit 15.

21, 23, 27 and 29 are protective diodes; 16 is an interface connection line of n-th circuit 13 and (n+1)-th circuit 14, while 17 is an interface connection line of (n+1)-th circuit 14 and (n+2)-th circuit 15.

Thus, in the present invention, there is provided a power supply circuit that generates voltage corresponding to the first operating voltage of a first circuit, and the voltage generated by the power supply circuit is supplied to the first circuit by a first power supply voltage supplying circuit; and, by means of a second power supply voltage supplying circuit, positive potential of voltage generated from the power supply circuit is lowered by a prescribed voltage through a voltage lowering element, while negative potential of voltage generated from the power supply circuit is raised by a prescribed voltage through a voltage raising element, thus forming the second operating voltage of the second circuit, this second operating voltage being supplied to the second circuit; thanks to the above construction, the latch-up phenomenon can be avoided while still keeping current consumption and electromagnetic interference (EMI) low.

Also, in the present invention, the voltage of an n-th power supply voltage supplying circuit is supplied to an n-th circuit, while, by means of an (n+1)-th power supply voltage supplying circuit, the n+1-th operating voltage of an (n+1)-th circuit is formed by lowering the positive potential of the voltage generated from the n-th power supply voltage supplying circuit by a prescribed voltage through a voltage lowering element, and raising the negative potential of the voltage generated from the n-th power supply voltage supplying circuit by a prescribed voltage through a voltage raising element, this (n+1)-th operating voltage being supplied to the (n+1)-th circuit; thanks to this construction, the latch-up phenomenon can be avoided while yet keeping current consumption and electromagnetic interference (EMI) low.

Figure 3:
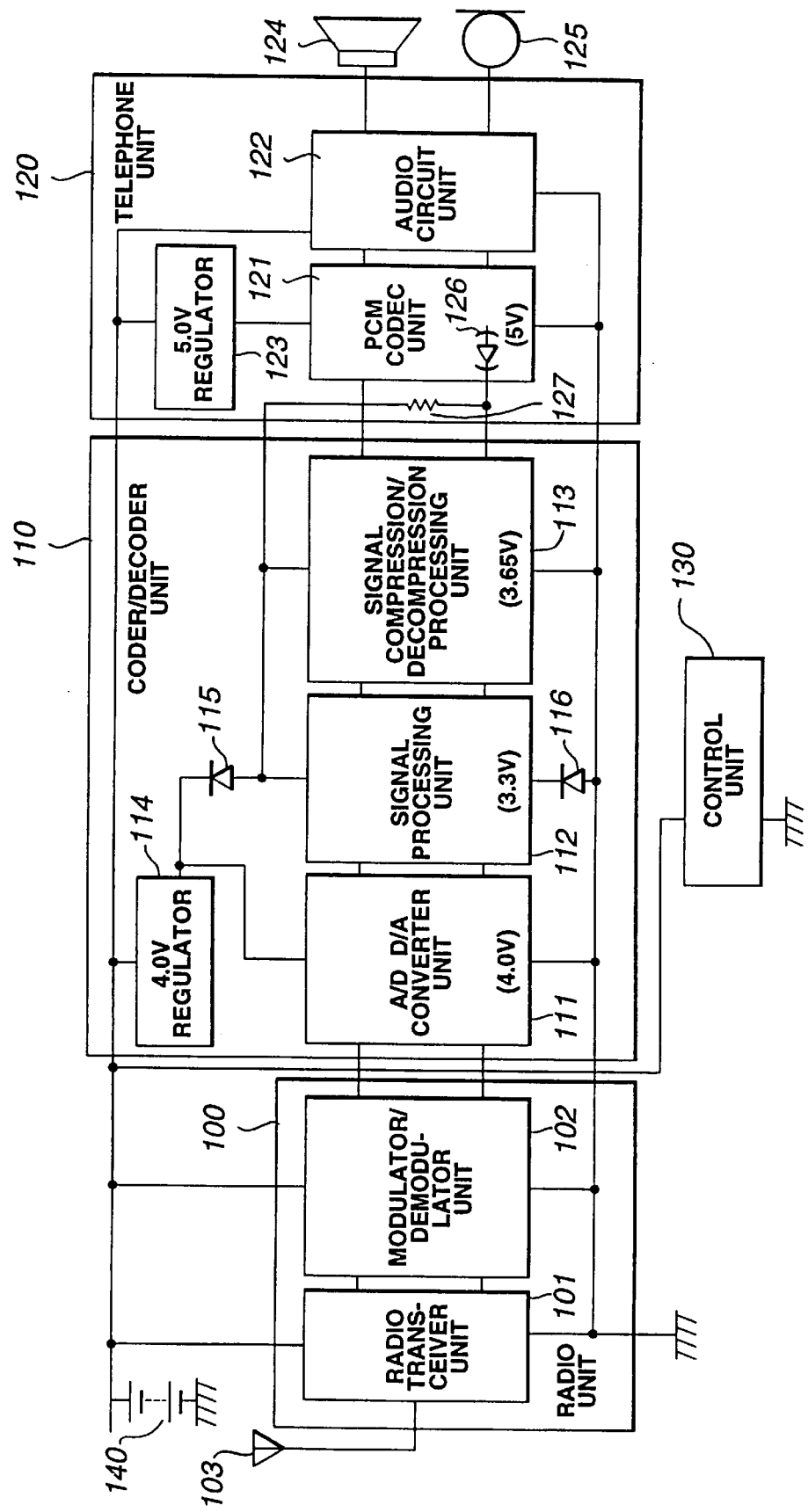
FIG. 3 is a circuit diagram showing an embodiment wherein a power supply voltage supplying circuit according to the present invention is employed in a child device of a portable telephone.
Figure 4:
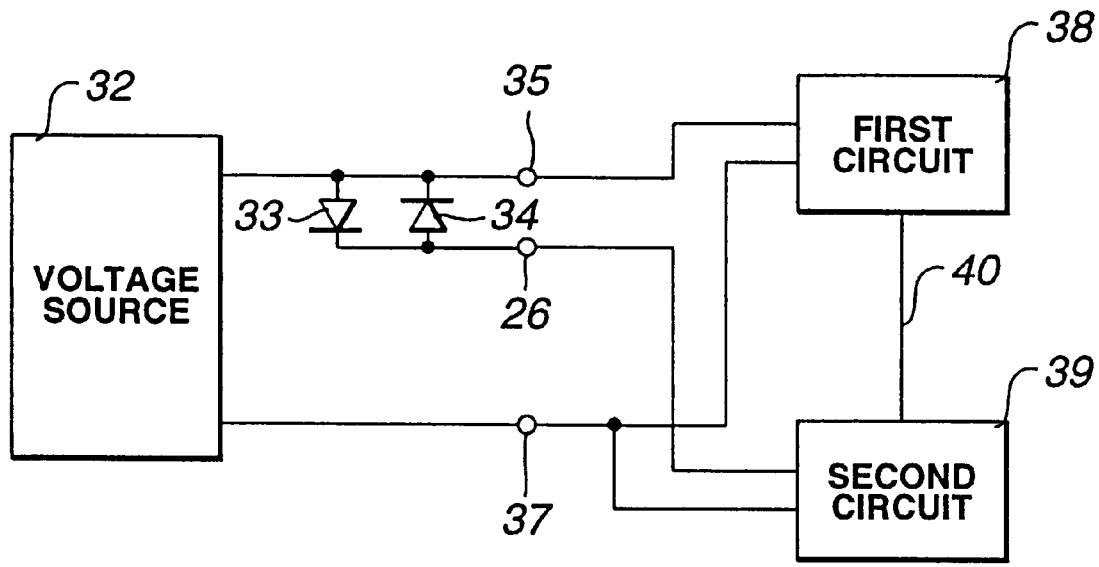
FIG. 4 is a circuit diagram showing a conventional power supply voltage supplying circuit.
Figure 5:
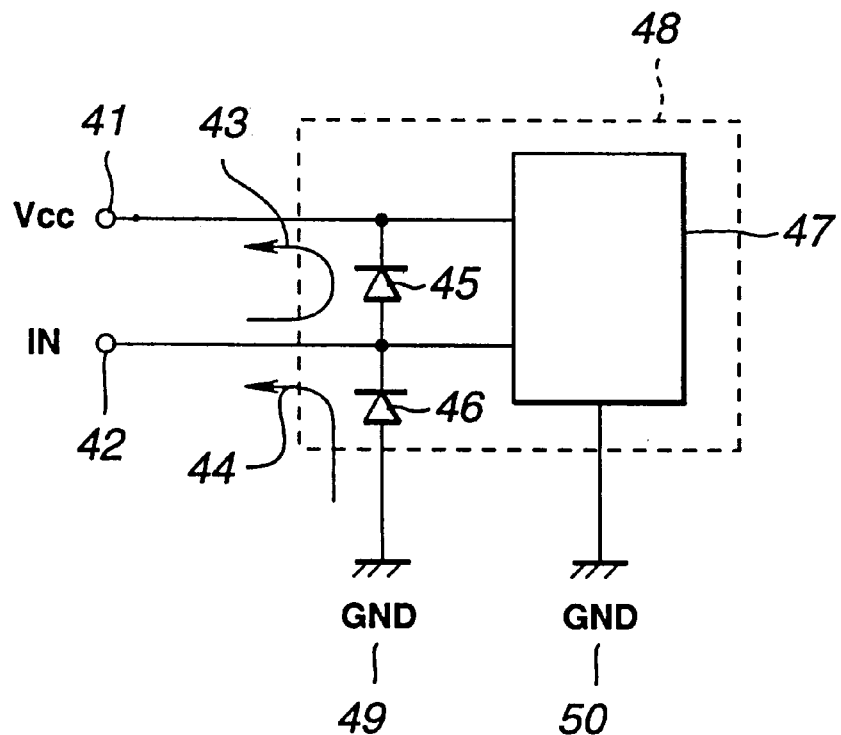
FIG. 5 is a view given in explanation of the latch-up phenomenon in a conventional power supply voltage supplying circuit.
Figure 6:
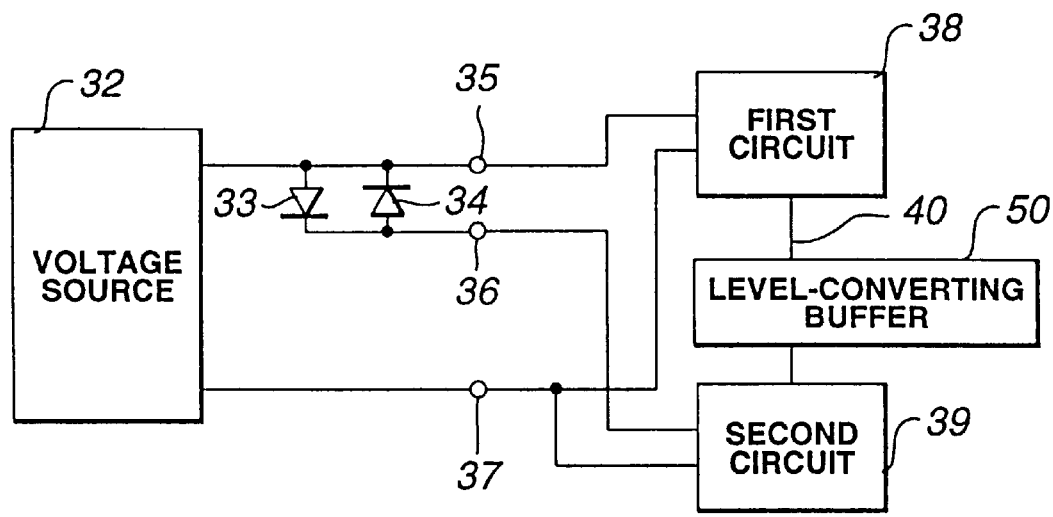
FIG. 6 is a circuit diagram showing a conventional power supply voltage supplying circuit for prevention of latch-up.
Figure 7:
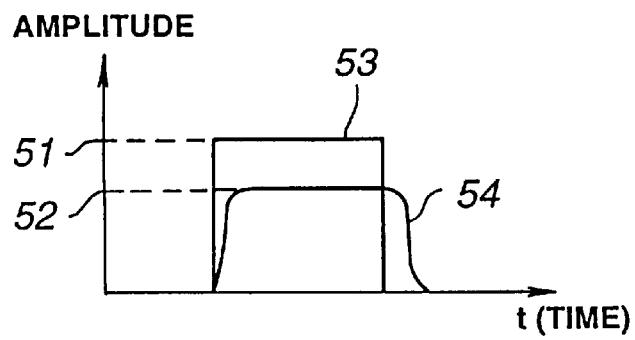
FIG. 7 is a circuit diagram showing the output waveform in the conventional power supply voltage supplying circuit.
Figure 8:
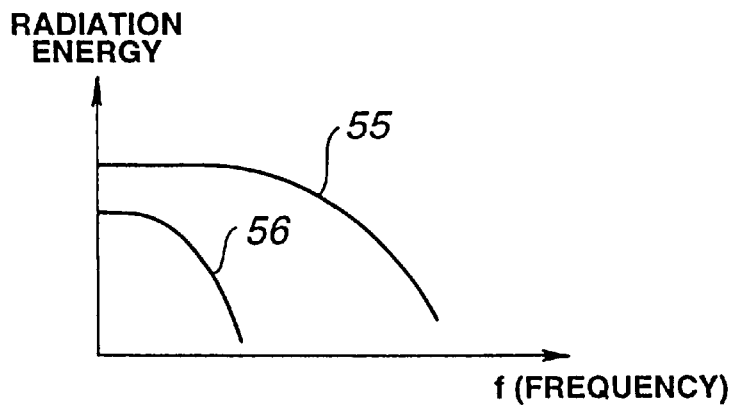
FIG. 8 is a frequency spectrum view showing the radiation energy corresponding to output waveform shown in FIG. 7 by means of a frequency spectrum.

FIG. 3 is a block diagram illustrating an example of a specific construction when the present invention is employed in the signal processing unit of a child device of a digital portable telephone.

In FIG. 3, a digital portable telephone is constituted of a radio unit 100, coder/decoder unit 110, telephone unit 120 and control unit 130.

Signals received by antenna 103 of radio unit 100 are received and amplified by radio transceiver unit 101 and demodulated by a modulating/demodulating unit 102. Further, a digital signal is regenerated by a A/D conversion performed by A/D·D/A converter unit 111 of coder/decoder unit 110, and the received signal is then decomposed by signal processing unit 112 and audio code decompression is then performed by signal compression/decompression processing unit 113, the result being decoded and subjected to D/A conversion in PCM codec unit 121 of telephone unit 120, and regenerated to audio by receiver 124 after power amplification by audio circuit unit 122.

The audio signal converted to an electrical signal by transmitter 125, on the other hand, passes through audio circuit unit 122, where it is converted to a PCM signal by PCM codec unit 121; it is then subjected to compression processing by signal compression/decompression processing unit 113 and synthesized to the transmission digital signal by signal processing unit 112; as a transmission signal it is then subjected to D/A conversion and synthesis by A/D·D/A converter unit 111 and modulated by modulator/ demodulator unit 102, then power-amplified by radio transceiver unit 101 and transmitted from antenna 103.

A/D·D/A converter unit 111 of coder/decoder unit 110 of this digital portable telephone child device, signal processing unit 112, signal compression/decompression unit 113, and PCM codec unit 121 of telephone unit 120 are constructed of a single IC in each case. The power supply of the digital portable telephone child device is obtained from a battery pack 140 of 7.2 V; the operating voltages of these ICs are respectively different, being 4.0 V in the case of A/D·D/A converter unit 111, 3.3 V in the case of signal processing unit 112, 3.65 V in the case of signal compression/decompression unit 113, and 5.0 V in the case of PCM codec unit 121.

There is therefore a risk of signal processing unit 112 being latched-up by the output of A/D·D/A converter unit 111 and of signal compression/decompression unit 113 being latched-up by the output of PCM codec unit 121. The present invention may be applied with benefit to such a case. (The operating voltages of other parts are not directly concerned in this description, and so will not be discussed.)

In this example, the voltage of battery pack 140 is supplied to A/D·D/A converter unit 111 dropped to 4.0 V by 4.0 V regulator 114. The ground level for this 4.0 V is raised by 0.35 V by Schottky barrier diode 116 and the 4.0 V voltage level is lowered by 0.35 V by Schottky barrier diode 115, thereby creating a power supply of 3.3 V, which is supplied to signal compression/decompression unit 113.

The difference between the high level of the output of A/D·D/A converter unit 111 and the high level of the power supply of signal processing unit 112 is therefore 0.35 V, so there is no risk of latch-up.

Also, at signal compression/decompression processing unit 113, 3.65 V is obtained by taking a voltage lowered by 0.35 V by Schottky barrier diode 115 on the positive side and taking ground potential on the negative side. It should be noted that since, between PCM codec unit 121 and signal compression/decompression processing unit 113, there is provided a buffer 126 of the open collector or open drain etc type, its output side being pulled up to the desired voltage by resistor 126, there is no need to apply the present invention.

Thus, by employing the present invention, power supply processing and latch-up prevention processing can be achieved concurrently and the number of elements can be greatly reduced.

INDUSTRIAL APPLICABILITY

The present invention can be applied to a power supply voltage supplying circuit that supplies power supply voltage to for example the signal processing unit etc of a child device of a digital portable telephone having at least two circuits of respective different operating voltages; with the present invention, a power supply voltage supplying circuit can be provided whereby latch-up can be avoided whilst still keeping current consumption and electromagnetic interference (EMI) low.

We claim:

1. A voltage supplying circuit for supplying a first voltage to a first circuit and a second voltage lower than the first voltage to a second circuit, said voltage supplying circuit comprising:

a voltage source for generating the first voltage and outputting the first voltage between positive and negative terminals thereof, said positive terminal of said voltage source being directly connected to a positive terminal of said first circuit and said negative terminal of said voltage source being directly connected to a negative terminal of said first circuit;

a voltage lowering element connected between said positive terminal of said voltage source and a positive terminal of said second circuit, said voltage lowering element lowering a voltage at said positive terminal of said voltage source and supplying the lowered voltage to said positive terminal of said second circuit; and a voltage raising element connected between said negative terminal of said voltage source and a negative terminal of said second circuit, said voltage raising element raising a voltage at said negative terminal of said voltage source and supplying the raised voltage to said negative terminal of said second circuit.

2. The voltage supplying circuit according to claim 1, wherein said first and second circuits are CMOS circuits.

3. The voltage supplying circuit according to claim 1, wherein said first and second circuits are incorporated in a portable telephone.

4. The voltage supplying circuit according to claim 1, wherein said voltage lowering element comprises a first diode having a first forward direction voltage drop and connected in a forward direction between said positive terminal of said voltage source and said positive terminal of said second circuit, and said voltage raising element comprises a second diode having a second forward direction voltage drop and connected in the forward direction between said negative terminal of said voltage source and said negative terminal of said second circuit, a sum of the first forward direction voltage drop and the second forward direction voltage drop being equal to a difference between the first and second voltages.

5. The voltage supplying circuit according to claim 4, wherein said first and second diodes comprise Schottky barrier diodes each having the same forward direction voltage drop.

6. The voltage supplying circuit according to claim 1, wherein said first and second circuits are connected via an interface connection line.

7. The voltage supplying circuit according to claim 6, wherein said second circuit comprises:

a first protective diode connected in a reverse direction between said interface connection line and said positive terminal of said second circuit, and a second protective diode connected in a reverse direction between said interface connection line and said negative terminal of said second circuit, a difference between the voltage supplied to said positive terminal of said second circuit and a voltage applied to said interface connection line being lower than a latch-up voltage of said first protective diode, and a difference between the voltage supplied to said negative terminal of said second circuit and the voltage applied to said interface connection being lower than a latch-up voltage of said second protective diode.

8. A voltage supplying circuit for supplying voltages to a plurality of functional circuits each operated by a different operating voltage, said voltage supplying circuit comprising:

first and second voltage supply lines for supplying voltages to positive and negative terminals of a first functional circuit;

a voltage lowering element connected between said first voltage supply line and a positive terminal of a second functional circuit, said voltage lowering element lowering a voltage of said first voltage supply line by a predetermined voltage and supplying the lowered voltage to said positive terminal of said second functional circuit; and a voltage raising element connected between said second voltage supply line and a negative terminal of said second functional circuit, said voltage raising element raising a voltage of said second voltage supply line by a predetermined voltage and supplying the raised voltage to said negative terminal of said second functional circuit.

9. The voltage supplying circuit according to claim 8, wherein a difference between the voltage supplied to said positive terminal of said second functional circuit and a voltage of an input signal applied to an input terminal of said second functional circuit is lower than a positive side latch-up voltage of said second functional circuit, and a difference between the voltage supplied to said negative terminal of said second functional circuit and the voltage of the input signal applied to said input terminal of said second functional circuit is lower than a negative side latch-up voltage of said second functional circuit.

10. The voltage supplying circuit according to claim 8, wherein each of said functional circuits comprises a CMOS circuit.

11. The voltage supplying circuit according to claim 8, wherein said first and second functional circuits are incorporated in a portable telephone.

12. The voltage supplying circuit according to claim 8, further comprising:

another voltage lowering element connected between a third voltage supplying line and said first voltage supplying line, said another voltage lowering element lowering a voltage of said third voltage supplying line and supplying the lowered voltage to said first voltage supplying line; and another voltage raising element connected between a fourth voltage supplying line and said second voltage supplying line, said another voltage raising element raising a voltage of said fourth voltage supplying line and supplying the raised voltage to said second voltage supplying line.

13. The voltage supplying circuit according to claim 8, wherein said functional circuits are connected together by an interface connecting line.

14. The voltage supplying circuit according to claim 8, wherein said voltage lowering element comprises at least one first diode having a first forward direction voltage drop and connected in a forward direction between said first voltage supply line and said positive terminal of said second functional circuit, said voltage raising element comprises at least one second diode having a second forward direction voltage drop and connected in the forward direction between said second voltage supply line and said negative terminal of said second functional circuit, a sum of the first forward direction voltage drop and the second forward direction voltage drop being equal to a difference between a voltage between said first and second voltage supply lines and an operational voltage of said second functional circuit.

15. The voltage supplying circuit according to claim 14, wherein said first and second diodes are Schottky barrier diodes having the same forward direction voltage drop.

\* \* \* \* \*

UNITED STATES PATENT AND TRADEMARK OFFICE
CERTIFICATE OF CORRECTION

PATENT NO.: 5,990,576

DATED: November 23, 1999

INVENTORS: Masaki SAKAI, *et al.*

It is certified that errors appear in the above-identified patent and that said Letters Patent is hereby corrected as shown below:

On the cover page, [56] References Cited, right column, line 14, between U.S. Patent Documents 4,129,788 and 4,673,864, insert --4,491,747   1/1985   Shimizu--; and lines 19 and 20, immediately below Foreign Patent Document 59-172830, insert the following:

--2-246516   10/1990   Japan
5-95273   4/1993   Japan--.

Signed and Sealed this

Eleventh Day of July, 2000

*Attest:*

Q. TODD DICKINSON

*Attesting Officer*   *Director of Patents and Trademarks*